(No Model.)
C. H. LAND.
OPERATIVE DENTISTRY.
No. 385,718. Patented July 10, 1888.
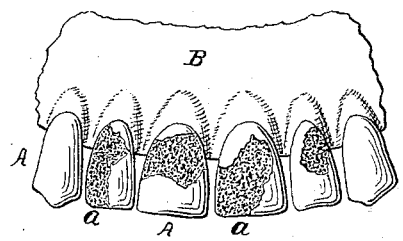
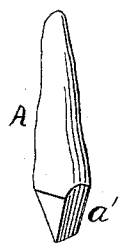
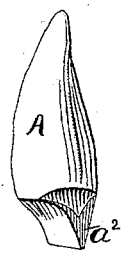
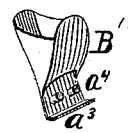
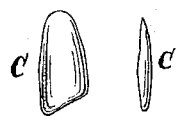
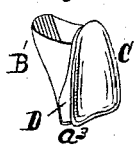
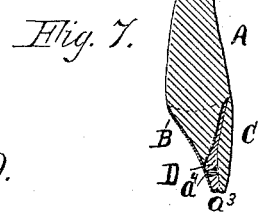
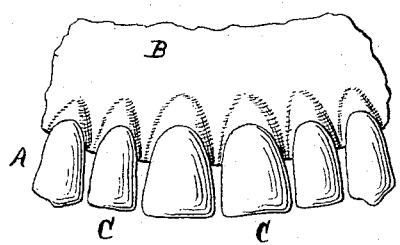
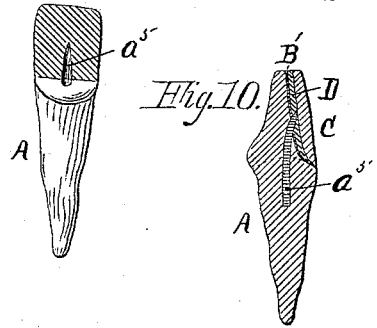
WITNESSES:
W. J. McMichael.
Alfred M. Low.
INVENTOR:
Charles H. Land.
By Newell S. Wright,
Attorney.

UNITED STATES PATENT OFFICE.

CHARLES H. LAND, OF DETROIT, MICHIGAN.

OPERATIVE DENTISTRY.

SPECIFICATION forming part of Letters Patent No. 385,718, dated July 10, 1888.

Application filed August 20, 1887. Serial No. 247,454. (No model.)

*To all whom it may concern:*

Be it known that I, CHARLES H. LAND, a citizen of the United States, residing at Detroit, county of Wayne, State of Michigan, have invented a certain new and useful Improvement in Restoring Decayed or Imperfect Teeth; and I declare the following to be a full, clear, and exact description of the same, such as will enable others skilled in the art to which it appertains to make and use the same, reference being had to the accompanying drawings, which form a part of this specification.

My invention relates to a new and useful improvement in restoring decayed or imperfect teeth to their original or proper shape, size, and color.

Hitherto various provisions have been made to restore injured or decayed teeth where the deranged portion is exposed to view—as, for instance, gold fillings or crowns often large and conspicuous, necessitating a very tedious and expensive operation. It has also been customary for dentists to tint the veneers employed in crowning teeth while in the "biscuit" to suit the particular case in hand, it having been found impracticable for each individual dentist to provide himself with a plant of molds of a variety to produce the various forms of veneer in a hardened and tinted state, for the reason that each mold would cost from thirty to sixty dollars, and a hundred or more such molds would be necessary.

A prominent feature of my invention consists in veneers, which may be previously prepared, of all forms and tints which may be required, and furnished to individual dentists to be kept in stock; and my invention consists in providing a metallic cover shaped to conform to the outline of the tooth to be crowned, a previously-prepared porcelain veneer fitted to said cover, and an intermediate stratum of porcelain paste, whereby the veneer may be fused to the plate.

In the drawings, Figure 1 is a view of a typical case of decayed incisors or front teeth. Fig. 2 is a view of a single tooth prepared for the fitting of the metallic cover. Fig. 3 is a modification wherein the tooth is built up with amalgam or other suitable substance preparatory to the fitting of the metallic cover thereon. Fig. 4 is a view of the metallic cover prepared to fit the tooth. Fig. 5 is a view of my porcelain veneer prepared to fit the metallic cover, the same being shown in perspective and side elevation. Fig. 6 shows the metallic cover with the veneer of porcelain fused thereupon. Fig. 7 is a sectional view of a tooth with my improved metallic cover provided with the porcelain veneer engaged therewith, and illustrating the porcelain body or paste employed between the veneer and the cover in fusing the two together. Fig. 8 is a view analogous to Fig. 1, but showing my improvement in a completed form. Fig. 9 represents a tooth prepared for a partial metallic enameled cover. Fig. 10 is a sectional view having a partial enameled cover applied to the tooth, and Fig. 11 is a separate view of a partial metallic cover.

I carry out my invention as follows:

A represents one or more teeth (shown in Figs. 1 and 8) engaged in corresponding sections of the jaw B.

In Fig. 1, $a$ represents decayed or injured portions of the teeth. In this case the teeth to be operated upon are prepared for the application of my improvement by first properly reducing the decayed or injured anterior surface. This may be done by means of a corundum wheel used in the dental engine, or otherwise, in the usual way. Such a reduced surface is shown in Fig. 2 at $a'$.

B' represents my improved metallic cover, preferably made of a thin plate of platinum or an alloy of iridium and platinum, the same having been fitted with accuracy upon the outside of the prepared tooth, so as to form a hollow shell or cover. Prior to fitting this metallic cover, in some cases it is desirable to build up the tooth with amalgam or other suitable substance, as is shown in Fig. 3 at $a^2$, and then to fit the metallic cover about the tooth so built up. This building up of the tooth may or may not be employed, as circumstances may require.

C represents one of my improved prepared porcelain veneers. These veneers are preferably prepared of enameled porcelain, which may be made to closely imitate the natural teeth not only in form and size, but also in color. These veneers, I would have it expressly understood, may be made as separate articles of manufacture, prepared purposely for this class of work, without pins or other analogous metallic fastenings, consisting, mainly, of enamel dense in texture and less porous than analogous structures made chiefly of porcelain. In application a suitable veneer is selected, which is then ground and fitted to its place upon the exterior surface of the metallic cover, the coating being removable after having been first fitted upon the tooth. By making the veneers as articles of manufacture it is evident that one of suitable size, form, and color may be selected, which may be ground and polished to a finish to fit the prepared cover in a very ready and expeditious manner. When properly shaped and made ready, the veneer is engaged upon the metallic cover by using a porcelain body or paste, (indicated at D,) the cover, veneer, and porcelain body being fused together. This being accomplished, the metallic cover, with its combined veneer, is then cemented upon the tooth. To hold the porcelain body securely in place upon the metallic cover, I prefer to construct the cover with a flanged projection at its outer end, thereby making a cup-shaped or other depression upon the outer face of the cover to support the said paste, as shown at $a^3$, and preferably, also, with pins or loops $a^4$, these serving to retain the porcelain body and hold it securely to the metal cover in a very efficient manner.

In operation the porcelain paste is applied to the metal cover, preferably provided with retaining devices—as, for instance, the flange, pins, or loops above described—and the veneer engaged therewith. When the process of restoration is completed, the tooth is thus thoroughly renewed in appearance, and in such a manner that the art and means by which the restoration has been accomplished is entirely concealed. The edges of the veneers adjacent to the gums may readily be concealed thereunder.

In a series of teeth a series of differently-colored porcelain bodies or pastes may be employed with a series of prepared porcelain veneers, as may be required to effect the desired shade or color. Where it is unnecessary or undesirable to extend the metallic cover entirely about the tooth, my invention contemplates, as coming within its scope, the employment of a partial cover of metal, in which case the cover may, if preferred, be held more securely in place by the use of pins or their equivalent.

In Fig. 9 is illustrated a typical case where a tooth is prepared for a partial metallic cover with its enameled front. In such a case the tooth may be reduced on the side of the decayed or injured portion, and perforated, if desirable, to receive one or more pins, screws, or tubes, $a^5$. The metal cover is then fitted upon the reduced portion of the tooth only and about the retaining-pins or analogous device, the latter projecting, if preferred, from the anterior portion of the cover, as at $a^6$, Fig. 11, as a retainer for the porcelain body. The cover, with its retaining device, is then removed from the tooth, the porcelain body applied to the anterior face thereof, and covering the projected end of the fastening. The prepared veneer is then engaged thereon, as before described, when the partial cover, with its retaining device, is cemented in place upon the tooth.

I would have it understood that I do not limit myself to applying the veneers upon any given side of the covers, as they may be employed for building up artificial crowns upon old roots, as well as to restore the appearance of the anterior surfaces of front or exposed teeth. The veneers may also be used on more than one side of the metallic covers, if found desirable.

Badly-decayed teeth may be thus restored to their original and natural appearance. So, also, undeveloped or imperfect teeth can in like manner be enlarged to their proper size and form and be made to appear perfect. Devitalized teeth which have become discolored can have an artificial veneer of enameled porcelain placed over them, and be thus renewed in appearance. Large and conspicuous gold fillings can also have porcelain veneers placed over them, and thus their glaring appearance be concealed.

What I claim is—

1. The herein-described tooth crown, consisting, essentially, of a metallic cover shaped to conform to the outline of the tooth to be crowned, a previously-prepared porcelain veneer fitted to said cover, and an intermediate stratum of porcelain paste, whereby the veneer may be fused to the said metallic cover, substantially as set forth.

2. The herein described tooth-crown, consisting, essentially, of a metallic cover having a flange projection at its outer end, forming a depression to support the paste, the said cover shaped to conform to the outline of the tooth to be crowned, a previously-prepared porcelain veneer fitted to said cover, and an intermediate stratum of porcelain paste, whereby the veneer may be fused to the cover, substantially as set forth.

3. The herein-described tooth-crown, consisting, essentially, of a metallic cover shaped to conform to the outline of the tooth to be crowned, the said cover being provided with a flange projection at its outer end and with pins projecting from the said flange projection, a previously-prepared porcelain veneer fitted to the said cover, and an intermediate stratum of porcelain paste located between the veneer and the cover and in contact with the flange projection, whereby the veneer may be fused to the cover and be held firmly in position, substantially as set forth.

In testimony whereof I sign this specification in the presence of two witnesses.

CHARLES H. LAND.

Witnesses:
N. S. WRIGHT,
W. J. MCMICHAEL.